(12) United States Patent
Park (10) Patent No.: US 11,919,565 B2
(45) Date of Patent: Mar. 5, 2024

(54) ELECTRIC STEERING COLUMN

(71) Applicant: HL MANDO CORPORATION, Pyeongtaek (KR)

(72) Inventor: Seok Park, Seongnam (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 18/058,971

(22) Filed: Nov. 28, 2022

(65) Prior Publication Data

US 2023/0174137 A1 Jun. 8, 2023

(30) Foreign Application Priority Data

Dec. 8, 2021 (KR) .................. 10-2021-0174465

(51) Int. Cl.
*B62D 1/181* (2006.01)
*B62D 1/185* (2006.01)

(52) U.S. Cl.
CPC ............ *B62D 1/181* (2013.01); *B62D 1/185* (2013.01)

(58) Field of Classification Search
CPC ........ B62D 1/181; B62D 1/185; B62D 1/187; F16C 11/04; F16C 2326/24; B60Y 2306/09
See application file for complete search history.

(56) References Cited

U.S. PATENT DOCUMENTS

| | | | |
|---|---|---|---|
| 10,780,910 B2* | 9/2020 | Palmer .................. | B62D 1/187 |
| 11,261,949 B2* | 3/2022 | Song ..................... | B60N 2/853 |
| 2018/0273080 A1* | 9/2018 | Martinez ............... | B62D 1/181 |
| 2018/0304777 A1* | 10/2018 | Ito ........................ | B60N 2/0727 |
| 2019/0202495 A1* | 7/2019 | Rouleau .............. | B62D 5/0454 |

FOREIGN PATENT DOCUMENTS

DE 102018202795 A1 * 8/2019 ............ B62D 1/181

* cited by examiner

*Primary Examiner* — Drew J Brown
(74) *Attorney, Agent, or Firm* — Harvest IP Law, LLP (57) ABSTRACT

Disclosed is an electric steering column, and the electric steering column includes: a telescopic motor; a telescopic screw unit having one side connected to the telescopic motor, and reciprocating linearly while being rotated by a driving force provided by the telescopic motor; a tube bracket provided on a tube surrounding the column shaft and connected to the other side of the telescopic screw unit; and a positioning member provided in the tube bracket to which the other side of the telescopic screw unit is coupled, and for adjusting the position of the other side of the telescopic screw unit so that the center of the telescopic motor and the central axis of the telescopic screw unit are positioned on a virtual straight line.

14 Claims, 9 Drawing Sheets

ELECTRIC STEERING COLUMN

CROSS-REFERENCE TO RELATED APPLICATION

This application claims priority under 35 U.S.C. § 119 to Korean Patent Application No. 10-2021-0174465, filed on Dec. 8, 2021, in the Korean Intellectual Property Office (KIPO), the disclosure of which is incorporated by reference herein in its entirety.

TECHNICAL FIELD

The present disclosure relates to an electric steering column, and more particularly, to an electric steering column in which a telescopic function is implemented.

BACKGROUND

In general, a steering device of a vehicle is a device for changing a direction of travel of the vehicle at the will of the driver, that is, a device that assists a driver to move the vehicle in a desired direction by arbitrarily changing the center of rotation at which the front wheel of the vehicle turns.

In the steering device, a steering force generated by the driver manipulating a steering wheel is transmitted to a lower rack-and-pinion mechanism through a steering shaft, and eventually changes the direction of both wheels.

Recently, the steering device includes telescopic and tilt functions. With these functions, the driver is able to adjust the protrusion and inclination angle of the steering wheel to suit his or her height or body type, thereby enabling a smooth steering operation.

Early telescopic and tilt functions are manual operating methods in which the driver needs to directly operate a control lever to move the steering wheel in an axial direction or to rotate the steering wheel around a hinge axis. However, recently, an automatic operating method using a motor has been developed and applied.

In the automatic operating method using a motor, a steering wheel moves forward and backward by a telescopic screw rotated by a telescopic motor. However, the center of the telescopic motor and the central axis of the telescopic screw do not exactly match due to the accumulation of minute assembly tolerances.

If the center of the telescopic motor does not coincide with the central axis of the telescopic screw, a load is applied to keep the central axis of the telescopic screw coincident with the center of the telescopic motor. Accordingly, when the steering wheel is moved forward and backward, bending or pinching of the telescopic screw occurs, thereby generating operating noise.

SUMMARY

In view of the above, the present disclosure provides an electric steering column capable of preventing occurrence of warpage of the telescopic screw and preventing noise generation when the telescopic function is implemented.

According to one embodiment of the present disclosure, an electric steering column includes: a telescopic motor; a telescopic screw unit having one side connected to the telescopic motor, and reciprocating linearly while being rotated by a driving force provided by the telescopic motor; a tube bracket provided on a tube surrounding the column shaft and connected to the other side of the telescopic screw unit; and a positioning member provided in the tube bracket to which the other side of the telescopic screw unit is coupled, and for adjusting the position of the other side of the telescopic screw unit so that the center of the telescopic motor and the central axis of the telescopic screw unit are positioned on a virtual straight line.

In addition, the tube bracket may include: a first through-hole formed in one side of the tube bracket so as to allow the tube to pass therethrough and be inserted thereinto; and a second through-hole spaced apart from the first through-hole by a set distance and formed so as to allow the positioning member to pass therethrough and be inserted thereinto.

The positioning member may include: a first guide bush provided in the second through-hole, and able to be rotated about a virtual first central axis intersecting a central axis of the telescopic screw unit; and a second guide bush provided in the first guide bush, having the other side of the telescopic screw unit passing therethrough and inserted thereto, and able to be rotated about a virtual second central axis that intersects the first central axis.

In addition, any one of the virtual first central axis and the virtual second central axis may be located parallel to the central axis of the telescopic screw unit.

In addition, the positioning member may further include: a first hinge pin having one side inserted into the tube bracket and the other side inserted into the first guide bush; and a second hinge pin having one side inserted into the first guide bush and the other side inserted into the second guide bush.

In addition, the first hinge pin may be provided such that the central axis of the first hinge pin coincides with the virtual first central axis, and the first hinge pin may be provided as a pair that is symmetrical with respect to the center of the first guide bush.

Also, the second hinge pin may be provided such that the central axis of the second hinge pin coincides with the virtual second central axis, and the second hinge pin may be provided as a pair that is symmetrical with respect to the center of the second guide bush. In addition, a first insertion groove may be formed in an outer circumferential surface of the first guide bush so as to allow the first hinge pin to be inserted thereinto.

In addition, a third through-hole may be formed in the first guide bush in a front-rear direction so as to allow the second guide bush to pass therethrough and be coupled thereto.

In addition, a first insertion hole penetrated toward the third through-hole may be formed in an outer circumferential surface of the first guide bush so as to allow the second hinge pin to be inserted thereinto.

In addition, a fourth through-hole may be formed in the second guide bush in the front-rear direction so as to allow the telescopic screw unit to pass therethrough and be coupled thereto.

In addition, a second insertion hole penetrated toward the fourth through-hole may be formed in the outer circumferential surface of the second guide bush so as to allow the second hinge pin to be inserted thereinto.

In addition, the outer circumferential surface of the first guide bush may be formed in a curved surface having a first virtual sphere that is formed with a diameter equal to a diameter of the second through-hole.

In addition, the outer circumferential surface of the second guide bush may be formed in a curved surface having a second virtual sphere that is formed with a diameter equal to a diameter of the third through-hole.

The details of other embodiments are included in the detailed description and drawings.

The electric steering column according to the present disclosure has the following effects.

First, a positioning member is provided, and by adjusting a position at which the other side of the telescopic screw unit is coupled, it is possible to align the central axis of the telescopic motor and the central axis of the telescopic screw unit to be positioned on a virtual straight line.

Second, if the central axis of the telescopic motor and the central axis of the telescopic screw unit are aligned to be positioned on a virtual straight line, it is possible to prevent bending of the telescopic screw unit, and to prevent noise caused by the catching of the telescopic screw unit during a linear reciprocating of the telescopic screw unit.

Third, if the telescopic screw unit is prevented from being caught, it is possible to extend the lifespan of the telescopic screw unit, which may make it possible to extend the lifespan of the electric steering column.

BRIEF DESCRIPTION OF THE DRAWINGS

FIG. 6 is an enlarged perspective view of a first guide bush and a second guide bush in

FIG. 5.

DETAILED DESCRIPTION

Hereinafter, the present invention will be described more fully hereinafter with reference to the accompanying drawings, in which exemplary embodiments of the invention are shown. Exemplary embodiments which will be described below will be modified in various different ways without departing from the spirit and the scope of the present invention, but the invention is not limited to the exemplary embodiments described herein.

It should be understood that the drawings are schematically illustrated but are not illustrated according to the exact scales. In addition, the relative size and ratio of each configuration shown in the drawings are arbitrarily illustrated for understanding and ease of description, and the thickness of layers, films, panels, regions, etc., are exaggerated or reduced for clarity. The arbitrary size is not restrictive but illustrative only. Further, the same reference numerals may denote the same structures, elements, or components shown in at least two drawings in order to represent corresponding or similar characteristics of another exemplary embodiment.

The exemplary embodiment of the present disclosure is specifically presented as ideal exemplary embodiments of the present disclosure. As a result, various modifications of the drawings are expected. Therefore, the exemplary embodiment is not limited to specific forms in regions illustrated in the drawings, and for example, includes modifications of forms by the manufacture.

Hereinafter, an electric steering column according to the present disclosure will be described with reference to FIGS. 1 to 9.

An electric steering column 1 according to an embodiment of the present disclosure includes a telescopic motor 10, a telescopic screw unit 20, a tube bracket 50, and a positioning member 100.

The telescopic motor 10 operates by receiving power and provides a driving force to rotate the telescopic screw unit 20 which will be described later.

Figure 1:
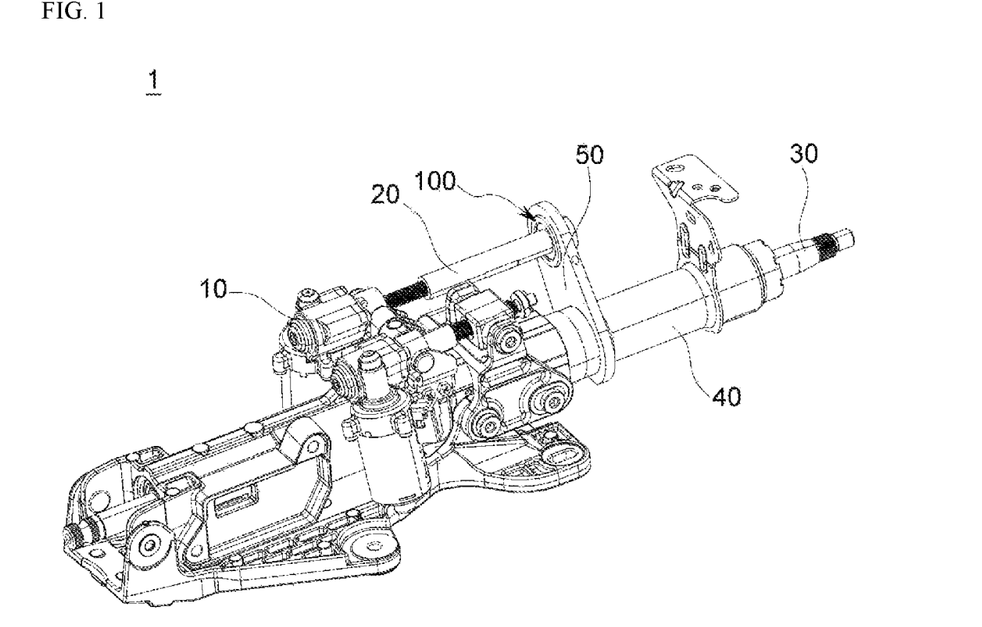
FIG. 1 is a perspective view showing an electric steering column according to an embodiment of the present disclosure.
Figure 2:
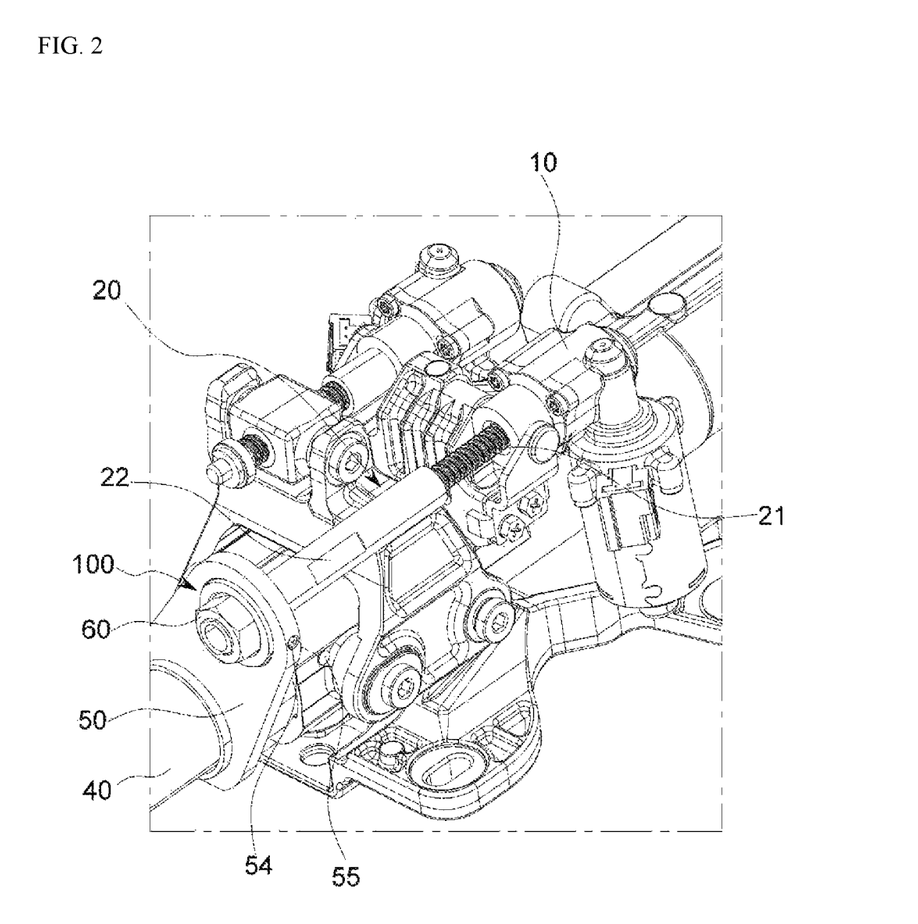
FIG. 2 is an enlarged perspective view of a part of the electric steering column according to FIG. 1.
Figure 3:
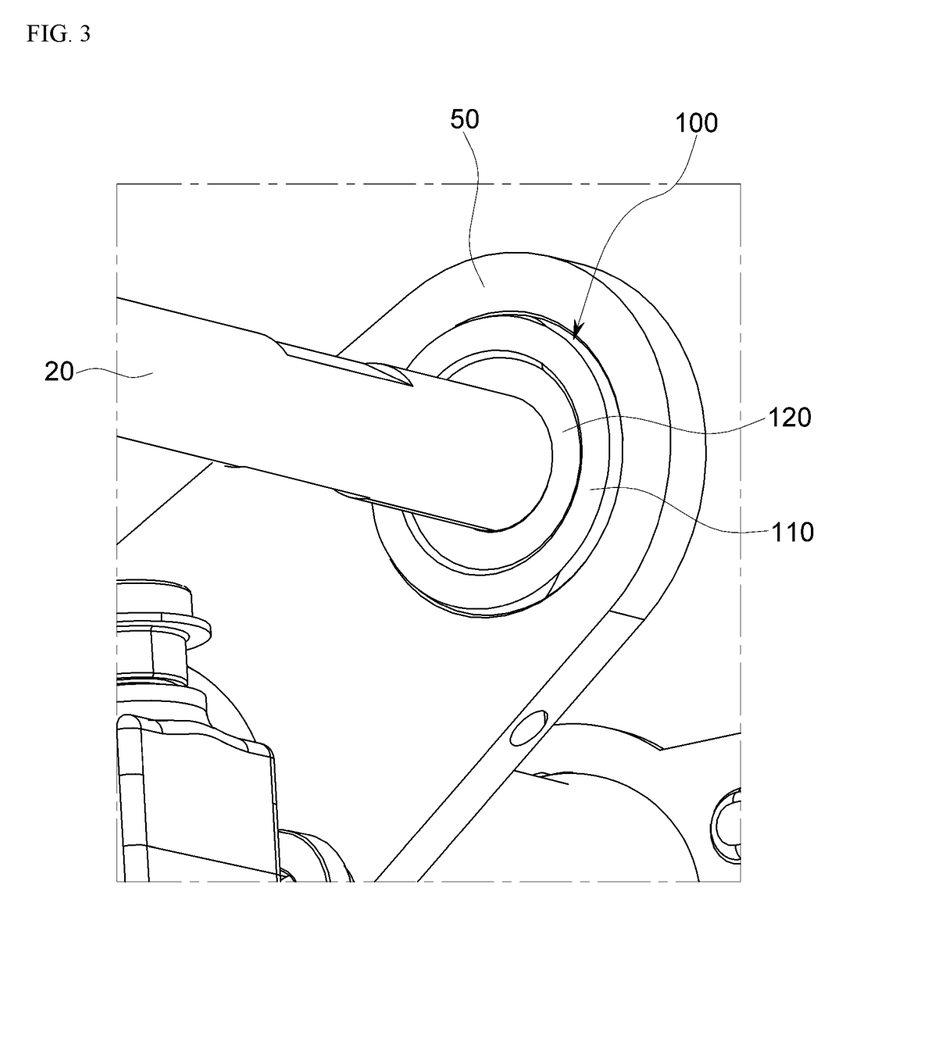
FIG. 3 is an enlarged partial perspective view of a part of a configuration of an electric steering column according to an embodiment of the present disclosure.

One side of the telescopic screw unit 20 is connected to the telescopic motor 10, as shown in FIGS. 1 and 2. In response to receiving a driving force from the telescopic motor 10, the telescopic screw unit 20 reciprocates linearly while rotating. Specifically, the telescopic screw unit 20 reciprocates linearly while rotating forward and backward.

The telescopic screw unit 20 includes a screw bolt 21 and a nut housing 22. One side of the screw bolt 21 is connected to the telescopic motor 10. The other side of the screw bolt 21 is coupled to the nut housing 22.

In response to receiving a driving force from the telescopic motor 10, the screw bolt 21 is rotated in one of forward and reverse directions. In this case, the screw bolt 21 moves in a direction away from the nut housing 22. In the meantime, when the screw bolt 21 is rotated in the other one of the forward and reverse directions in response to receiving a driving force from the telescopic motor 10, the screw bolt 21 is moved in a direction closer to the nut housing 22. That is, the telescopic screw unit 20 reciprocates linearly by a rotational driving force provided from the telescopic motor 10.

As described above, one side of the nut housing 22 is coupled to the screw bolt 21, and the other side thereof is connected to the tube bracket 50. In one side of the nut housing 22, a groove (not shown) that is concave by a set depth toward the other side of the nut housing 22 is formed. Here, one side of the nut housing 22 is a side facing the screw bolt 21. In an inner circumferential surface of the groove (not shown), a screw thread is formed so that the screw bolt 21 can be fastened.

The other side of the nut housing 22 is connected to the tube bracket 50. Specifically, the other side of the nut housing 22 passes through the tube bracket 50. In the nut housing 22, a nut coupling portion (not marked) is formed by a set length in a direction from the tip of the other side toward one side of the nut housing 22. The nut coupling portion (not marked) protrudes from the tube bracket 50 in a direction opposite to the screw bolt 21. The nut coupling portion (not marked) is coupled to a nut 60 to prevent the nut housing 22 from being deviated or separated from the tube bracket 50.

The tube bracket 50 is provided to be connected to the telescopic screw unit 20, as described above. The tube bracket 50 is provided on the tube 40 that embraces a column shaft (not shown).

Figure 4:
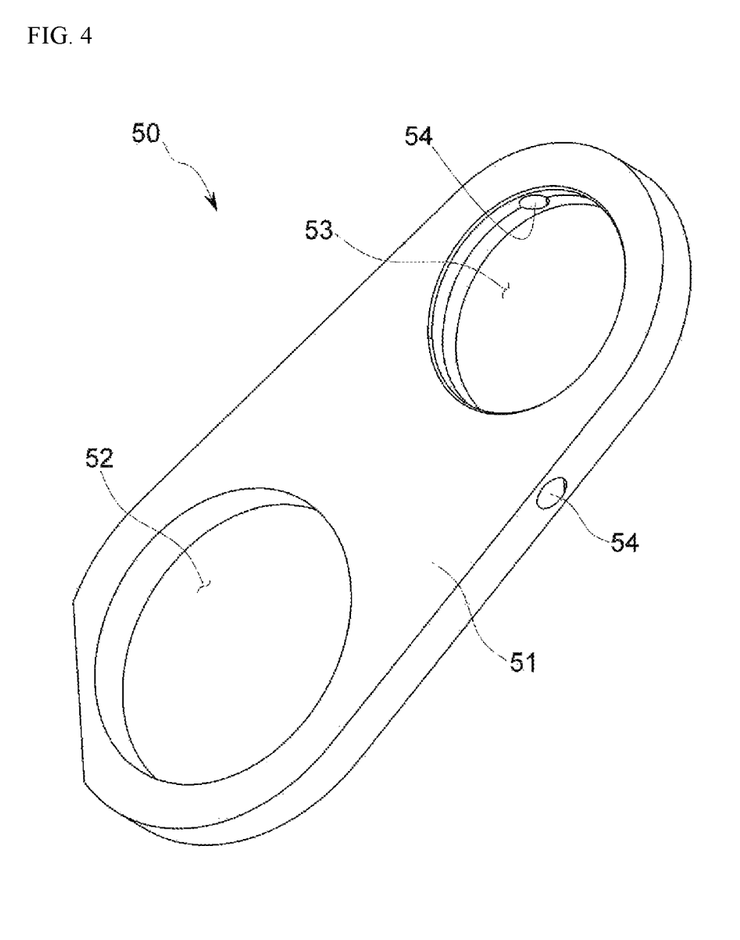
FIG. 4 is a perspective view showing a tube bracket.

FIG. 4 shows the tube bracket 50 in detail. The tube bracket 50 includes a plate-shaped body 51 having a set thickness. A first through-hole 52 and a second through-hole 53 are formed in the body 51. The first through-hole 52 is formed on one side of the body 51, and the second through-hole 53 is formed at a position spaced apart from the first through-hole 52 by a set distance. In this embodiment, as shown in FIG. 4, the first through-hole 52 is formed to penetrate through a lower side of the body 51 and the second through-hole 53 is formed to penetrate through an upper side of the body 51.

The first through-hole 52 is formed so as to allow the tube 40 to pass therethrough and be inserted thereinto. The second through-hole 53 is formed so as to allow the positioning member 100 to pass therethrough and be coupled thereto.

A pin coupling hole 54 penetrated toward the second through-hole 53 is formed in one side of the body 51 of the tube bracket 50. The pin coupling hole 54 is formed as a single hole or a pair of holes facing each other.

Figure 5:
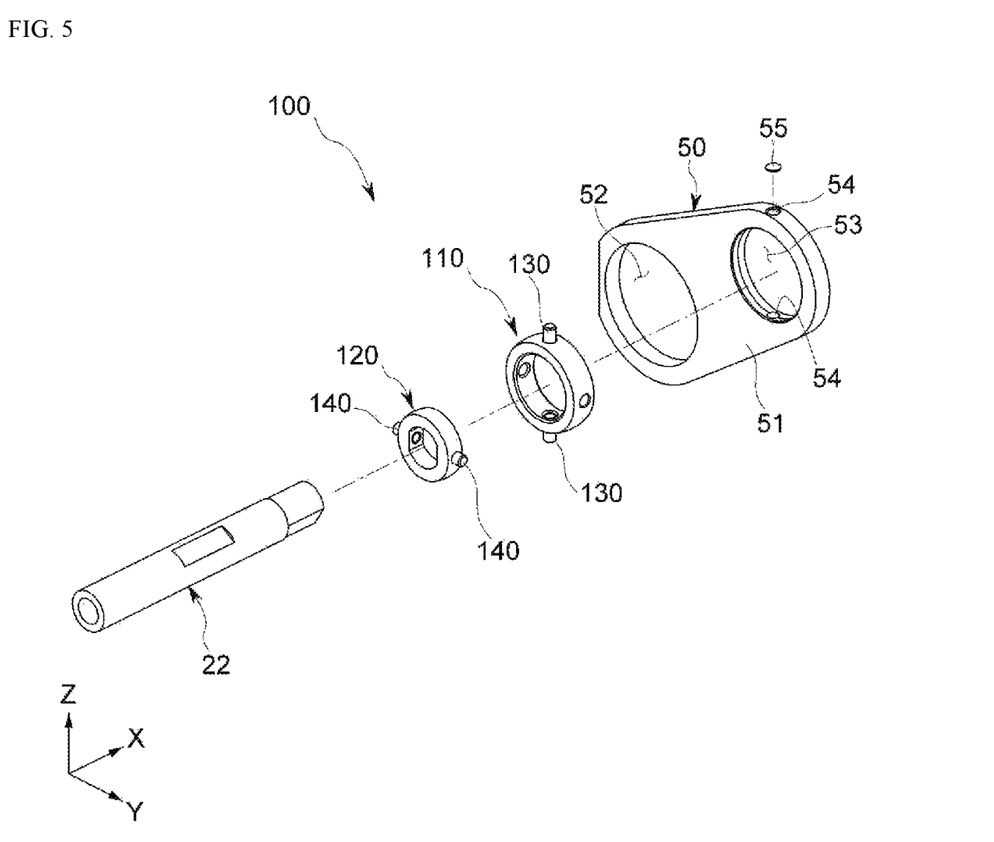
FIG. 5 is an exploded perspective view illustrating a partial configuration of an electric steering column according to an embodiment of the present disclosure.
Figure 6:
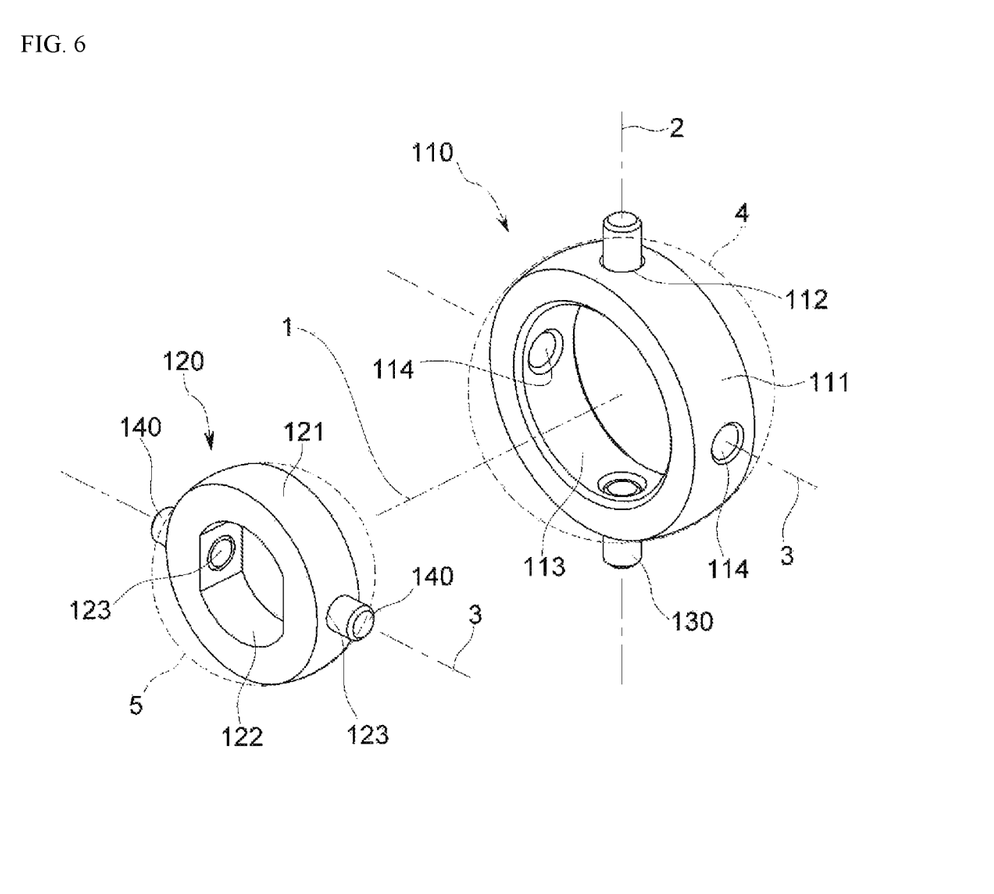
Figure 7:
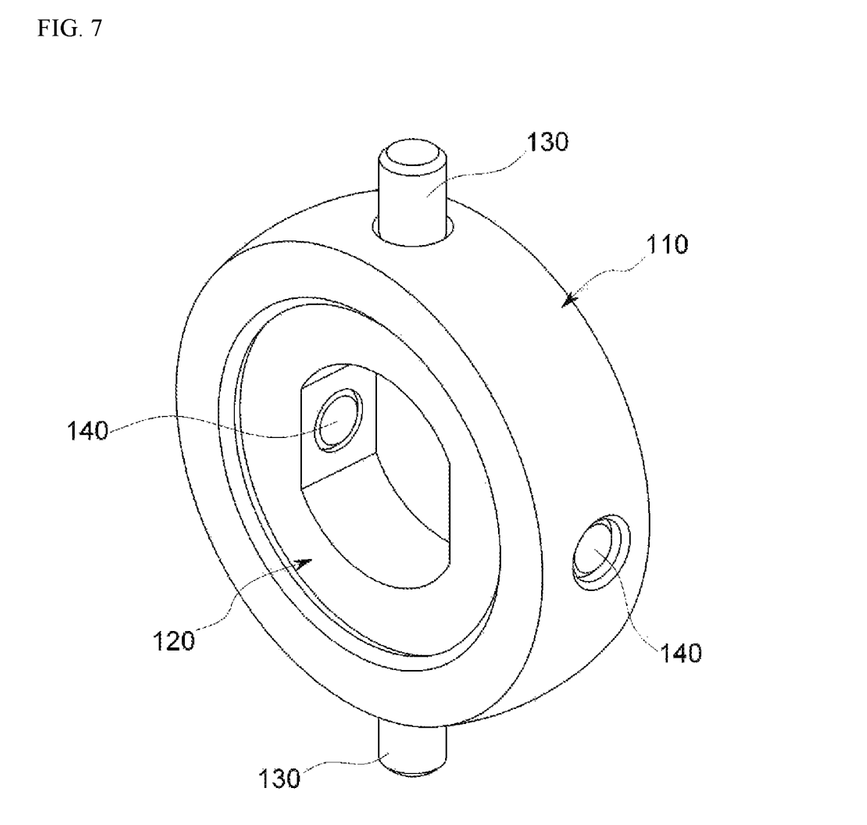
FIG. 7 is a perspective view showing a positioning member.

Referring to FIG. 2 or 5, the tube bracket 50 may further include a cap 55. The cap 55 covers the pin coupling hole 54 when inserted into the pin coupling hole 54.

Since a first hinge pin 130 coupled to the pin coupling hole 54 is simply inserted into the pin coupling hole 54, the first hinge pin 130 may be separated from the first guide bush 110 over time. If the cap 55 is not provided, the first hinge pin 130 may be separated from the pin coupling hole 54 and hence the first hinge pin 130 may be lost.

Meanwhile, as described above, if the pin coupling hole 54 is covered by the cap 55, it is possible to prevent the first hinge pin 130 from being completely separated or lost.

The positioning member 100 is provided in the tube bracket 50. Specifically, the positioning member 100 passes through the second through-hole 53 of the tube bracket 50 and is coupled thereto. The other side of the telescopic screw unit 20 is coupled to the positioning member 100. Specifically, the other side of the nut housing 22 passes through the positioning member 100 and is coupled thereto.

The positioning member 100 adjusts the position of the other side of the telescopic screw unit 20, so that the center of the telescopic motor 10 and the central axis of the telescopic screw unit 20 are positioned on a virtual straight line. This will be described in detail with the description of the configuration of the positioning member 100.

In FIGS. 5 to 8, the structure of the positioning member 100 is shown in detail. Referring to FIGS. 5 to 8, the positioning member 100 includes a first guide bush 110, a second guide bush 120, a first hinge pin 130, and a second hinge pin 140.

The first guide bush 110 is provided in the second through-hole 53, and the first guide bush 110 passes through the second through-hole 53 to be coupled thereto. The first guide bush 110 is rotated about a virtual first central axis 2 that intersects a central axis 1 of the telescopic screw unit 20.

In this embodiment, the central axis 1 of the telescopic screw unit 20 is in an x-axis direction and the virtual first central axis 2 is in the z-axis direction. That is, the first guide bush 110 is rotated about the z-axis direction. To this end, the first guide bush 110 is hinge-coupled to the tube bracket 50 by the first hinge pin 130.

A first insertion groove 112 is formed in an outer circumferential surface 111 of the first guide bush 110 so as to allow the first hinge pin 130 to be inserted thereinto. The first insertion groove 112 is formed at a position where the central axis of the first insertion groove 112 coincides with the virtual first central axis 2. One side of the first hinge pin 130 is inserted into the first insertion groove 112 and the other side of the first hinge 130 is inserted into the pin coupling hole 54, so that the first guide bush 110 is hinge-coupled to the tube bracket 50.

The first guide bush 110 passing through and coupled to the second through-hole 53 of the tube bracket 50 is rotated about the first hinge pin 130. Thus, the outer circumferential surface 111 of the first guide bush 110 is formed in a curved surface, so that the first guide bush 110 can be rotated without interference with the second through-hole 53.

Specifically, the outer circumferential surface 111 of the first guide bush 110 is formed in a curved surface having a virtual first sphere 4 that is formed with a diameter equal to a diameter of the second through-hole 53 based on the virtual first central axis 2.

A third through-hole 113 penetrated in a front-rear direction is formed in the first guide bush 110 so as to allow the second guide bush 120 to pass therethrough and be coupled thereto. Meanwhile, a first insertion hole 114 is further formed in the outer circumferential surface 111 of the first guide bush 110.

The first insertion hole 114 is formed at a position coincident with the virtual second central axis 3 that intersects the virtual first central axis 2. Specifically, the virtual second central axis 3 intersects with the central axis 1 of the telescopic screw unit 20 and at the same time intersects the virtual first central axis 2.

The second guide bush 120 passes through the third through-hole 113 of the first guide bush 110 and is coupled thereto, as described above. The second guide bush 120 is hinge-coupled to the first guide bush 110 by the second hinge pin 140. Thus, the second guide bush 120 is rotated about the second hinge pin 140.

As described above, the virtual first central axis 2 coincident with the central axis of the first hinge pin 130 and the virtual second central axis 3 coincident with the central axis of the second hinge pin 140 intersect each other. In the above description, since the virtual first central axis 2 is in the z-axis direction, the virtual second central axis 3 is in the y-axis direction. That is, the second guide bush 120 being rotated about the second hinge pin 140 is rotated about the y-axis direction.

When being rotated about the second hinge pin 140, the second guide bush 120 should not interfere with the third through-hole 113. Thus, an outer circumferential surface 121 of the second guide bush 120 is also formed in a curved surface.

Specifically, the outer circumferential surface 121 of the second guide bush 120 is formed in a curved surface having a virtual second sphere 5 that is formed with a diameter equal to a diameter of the third through-hole 113 with respect to the virtual second central axis 3.

In the second guide bush 120, a fourth through-hole 122 penetrated in the front-rear direction is formed. The other side of the nut housing 22 passes through the fourth through-hole 122 and is coupled thereto. A cross-sectional shape of the fourth through-hole 122 is the same as that of the nut housing 22.

A second insertion hole 123 penetrated toward the fourth through-hole 122 is formed in the outer circumferential surface of the second guide bush 120. The second insertion hole 123 is formed at a position where the central axis of the second insertion hole 123 coincides with the virtual second central axis 3. One side of the second hinge pin 140 is inserted into the second insertion hole 123. That is, the second hinge pin 140 is simultaneously inserted into the first insertion hole 114 and the second insertion hole 124.

The second guide bush 120 is rotated in a direction crossing the direction in which the first guide bush 110 is rotated about the second hinge pin 140. As described above, when the central axis of the telescopic screw unit 20 is in the x-axis direction, the first guide bush 110 may be rotated about the z-axis direction A and the second guide bush 120 may be rotated in the y-axis direction B. (See FIG. 8)

Figure 8:
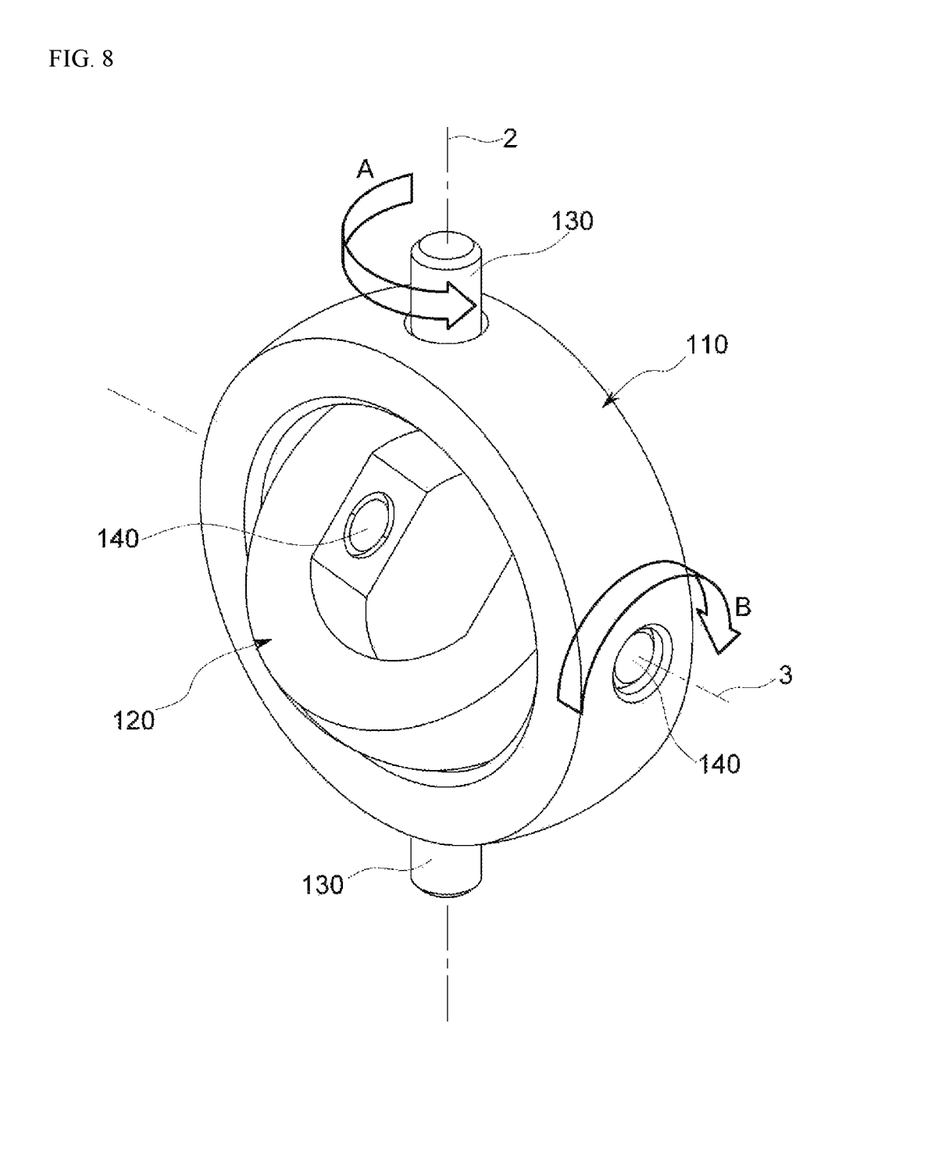
FIG. 8 is a perspective view showing a state in which a positioning member is arbitrarily operated.

Thus, it is possible to adjust the position of the other side of the telescopic screw unit 20 by rotating the telescopic screw unit 20 in the y-axis and z-axis directions. That is, the position of the other side of the telescopic screw unit 20 may be adjusted, so that the central axis of the telescopic screw unit 20 and the center of the telescopic motor 10 can be positioned on a virtual straight line.

Figure 9A:
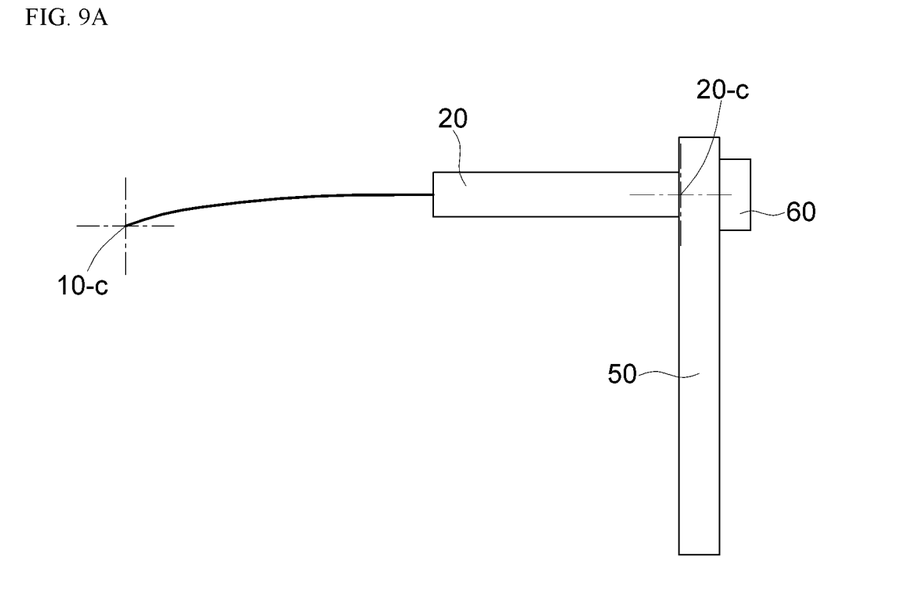
FIGS. 9A and 9B are a schematic diagram illustrating a difference between a conventional electric steering column and an electric steering column according to an embodiment of the present disclosure.
Figure 9B:
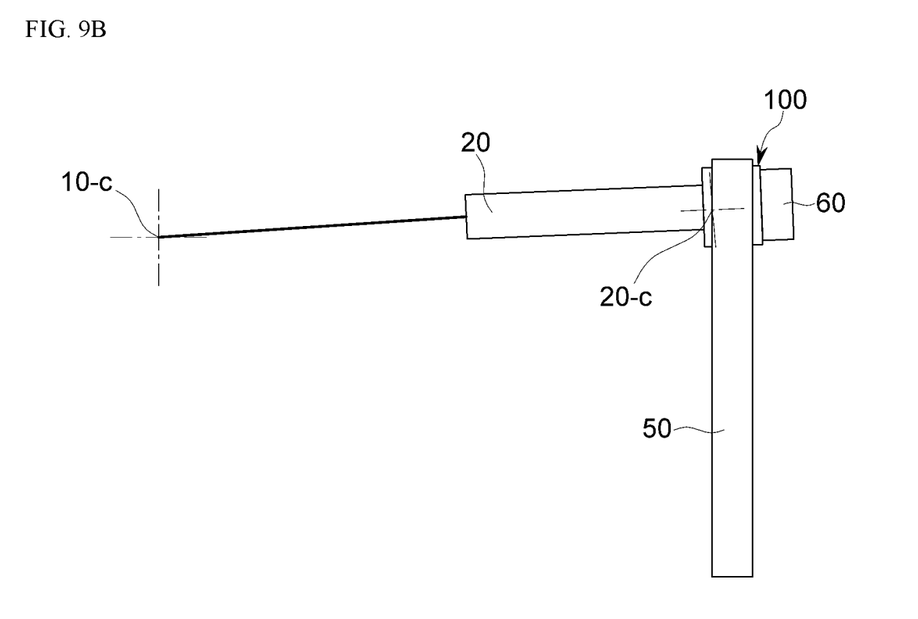

FIG. 9 schematically shows a difference between a state (a) the central axis of the telescopic screw unit when the positioning member according to the present disclosure is not used and a state (b) of the central axis of the telescopic screw unit when the positioning member according to the present disclosure is used.

In the electric steering column, a telescopic motor 10, a telescopic screw unit 20, and a tube bracket 50 are assembled. However, in this case, manufacturing tolerances generated during the manufacturing of the telescopic screw unit 20 and the tube bracket 50 and assembly tolerances generated during the assembling of the telescopic screw unit 20 and the tube bracket 50 are accumulated. Accordingly, as shown in FIG. 9A, when the telescopic motor 10, the telescopic screw unit 20, and the tube bracket 50 are assembled without using the positioning member 100 according to the present disclosure, bending occurs so that a central axis 20-c of the telescopic screw unit 20 coincides with a center 10-c of the telescopic motor 10.

Thus, when the screw bolt 21 is rotated by a rotational driving force provided by the telescopic motor 10 and moved in a direction closer to or away from the nut housing 22, the screw bolt 21 may be caught in the nut housing and operating noise may occur.

In addition, the occurrence of bending means that a load is applied to the screw bolt 21. That is, the load applied to the screw bolt 21 may cause the telescopic screw unit 20 to fail.

However, using the positioning member 100 according to the present disclosure, the above-described problem may be solved. In a case where the positioning member 100 is used, the position to which the other side of the telescopic screw unit 20 is coupled may be adjusted by rotating the first guide bush 110 and the second guide bush 120 in the z-axis direction and the y-axis direction, respectively.

Accordingly, as shown in FIG. 9B, the central axis 20-c of the telescopic screw unit 20 is aligned with the center 10-c of the tele-motor 10 on a virtual straight line.

That is, the screw bolt 21 does not bend, and when reciprocating to move away from or closer to the nut housing 22, the screw bolt 21 is not caught by the nut housing 22 and thus noise is not generated.

In addition, since a load is not applied to the screw bolt 21, a failure of the telescopic screw unit 20 does not occur, thereby extending the life of the electric steering column.

The exemplary embodiments of the present disclosure have been described with reference to the accompanying drawings, but those skilled in the art will understand that the present disclosure may be implemented in other specific forms without changing the technical spirit or an essential feature thereof.

Accordingly, it will be understood that the aforementioned exemplary embodiments are described for illustration in all aspects and are not limited, and it will be construed that the scope of the present disclosure is represented by the claims to be described below, and all of the changes or modified forms induced from the meaning and the scope of the claims, and an equivalent concept thereof are included in the scope of the present disclosure.

[Detailed Description of Main Elements]

| | |
|---|---|
| 10: telescopic motor | 20: telescopic screw unit |
| 21: screw bolt | 22: nut housing |
| 30: column shaft | 40: tube |
| 50: tube bracket | 51: body |
| 52: first through-hole | 53: second through-hole |
| 54: pin coupling hole | 55: cap |
| 60: nut | 100: positioning member |
| 110: first guide bush | 111: outer circumferential surface |
| 112: first insertion groove | 113: third through-hole |
| 114: first insertion hole | 120: second guide bush |
| 121: outer circumferential surface | 122: fourth through-hole |
| 123: second insertion hole | 130: first hinge pin |
| 140: second hinge pin | |

What is claimed is:

1. An electric steering column comprising:
   a telescopic motor;
   a telescopic screw unit having one side connected to the telescopic motor, and reciprocating linearly while being rotated by a driving force provided by the telescopic motor;
   a tube bracket provided on a tube surrounding the column shaft and connected to the other side of the telescopic screw unit; and
   a positioning member provided in the tube bracket to which the other side of the telescopic screw unit is coupled, and for adjusting the position of the other side of the telescopic screw unit so that the center of the telescopic motor and the central axis of the telescopic screw unit are positioned on a virtual straight line,
   wherein the tube bracket comprises: a first through-hole formed in one side of the tube bracket so as to allow the tube to pass therethrough and be inserted thereinto; and a second through-hole spaced apart from the first through-hole by a set distance and formed so as to allow the positioning member to pass therethrough and be inserted thereinto.

2. The electric steering column of claim 1, wherein the positioning member comprises:
   a first guide bush provided in the second through-hole, and able to be rotated about a virtual first central axis intersecting a central axis of the telescopic screw unit; and
   a second guide bush provided in the first guide bush, having the other side of the telescopic screw unit passing therethrough and inserted thereto, and able to be rotated about a virtual second central axis that intersects the first central axis.

3. The electric steering column of claim 2, wherein any one of the virtual first central axis and the virtual second central axis is located parallel to the central axis of the telescopic screw unit.

4. The electric steering column of claim 3, wherein the outer circumferential surface of the first guide bush is formed in a curved surface having a first virtual sphere that is formed with a diameter equal to a diameter of the second through-hole.

5. The electric steering column of claim 2, wherein the positioning member further comprises:
   a first hinge pin having one side inserted into the tube bracket and the other side inserted into the first guide bush; and a second hinge pin having one side inserted into the first guide bush and the other side inserted into the second guide bush.

6. The electric steering column of claim 5, wherein the first hinge pin is provided such that the central axis of the first hinge pin coincides with the virtual first central axis, and the first hinge pin is provided as a pair symmetrical with respect to the center of the first guide bush.

7. The electric steering column of claim 5, wherein the second hinge pin is provided such that the central axis of the second hinge pin coincides with the virtual second central axis, and the second hinge pin is provided as a pair symmetrical with respect to the center of the second guide bush.

8. The electric steering column of claim 5, wherein a first insertion groove is formed in an outer circumferential surface of the first guide bush so as to allow the first hinge pin to be inserted thereinto.

9. The electric steering column of claim 5, wherein a third through-hole is formed in the first guide bush in a front-rear direction so as to allow the second guide bush to pass therethrough and be coupled thereto.

10. The electric steering device of claim 9, wherein the outer circumferential surface of the second guide bush is formed in a curved surface having a second virtual sphere that is formed with a diameter equal to a diameter of the third through-hole.

11. The electric steering column of claim 5, wherein a first insertion hole penetrated toward the third through-hole is formed in an outer circumferential surface of the first guide bush so as to allow the second hinge pin to be inserted thereinto.

12. The electric steering column of claim 5, wherein a fourth through-hole is formed in the second guide bush in the front-rear direction so as to allow the telescopic screw unit to pass therethrough and be coupled thereto.

13. The electric steering column of claim 12, wherein a second insertion hole penetrated toward the fourth through-hole is formed in the outer circumferential surface of the second guide bush so as to allow the second hinge pin to be inserted thereinto.

14. The electric steering device of claim 1, wherein the telescopic screw unit comprises a screw bolt and a nut housing, with one side of the screw bolt connected to the telescopic motor, the other side of the screw bolt coupled to the nut housing, one side of the nut housing coupled to the screw bolt, and the other side of the nut housing connected to the tube bracket.

* * * * *